United States Patent [19]
De Angelis et al.

[11] Patent Number: 6,135,529
[45] Date of Patent: Oct. 24, 2000

[54] MULTI-POSITION SLIDING CENTER CONSOLE

[75] Inventors: Dean G. De Angelis, South Lyon; Paul E. Newman, Troy; Albert Shane, Waterford; Omar D. Tame, West Bloomfield, all of Mich.

[73] Assignee: Atoma International Inc., Newmarket, Canada

[21] Appl. No.: 09/136,783

[22] Filed: Aug. 19, 1998

Related U.S. Application Data

[60] Provisional application No. 60/056,542, Aug. 19, 1997.

[51] Int. Cl.[7] .................................................. B60N 3/12
[52] U.S. Cl. ......................... 296/37.8; 224/540; 224/281
[58] Field of Search ................................. 296/24.1, 37.1, 296/37.8, 37.14; 224/281, 539, 540

[56] References Cited

U.S. PATENT DOCUMENTS 3,356,409  12/1967  Belsky et al. ........................... 296/24.1

5,951,084  9/1999  Okazaki et al. ........................ 296/37.16

FOREIGN PATENT DOCUMENTS

62-194955  of 1987  Japan.

*Primary Examiner*—D. Glenn Dayoan
*Assistant Examiner*—Jason Morrow
*Attorney, Agent, or Firm*—Howard & Howard

[57] ABSTRACT

An interior assembly for a vehicle comprising a center console and a guide member for mounting the console to the vehicle. Preferably, the center console is of the type including at least one storage compartment and an associated lid. The guide member defines a reciprocal path from a first end of the guide to a second end of the guide. Preferably the first end of the guide is adjacent a set of front passenger seats and the second end of the guide is adjacent a set of rear passenger seats. A carriage is operatively coupled between the console and the guide member for slidably moving the console on the guide member along the reciprocal path between the front and rear passenger seats.

25 Claims, 6 Drawing Sheets

MULTI-POSITION SLIDING CENTER CONSOLE

RELATED APPLICATION

This patent application claims priority to and all the benefits of U.S. Provisional Patent Application Ser. No. 60/056,542, filed on Aug. 19, 1997 and entitled "Multi-Position Sliding Center Console with Adjustable Table Top".

TECHNICAL FIELD

The subject invention relates to center console assemblies for vehicles. More specifically, the subject invention relates to a slidable center console assembly which in moveable from a first use position between a first set of passenger seats to a second use position between a second set of passenger seats.

BACKGROUND OF THE INVENTION

Vehicle interiors typically include front passenger seats and rear passenger seats positioned behind the front seats. These passenger seats can either be individual bucket type seats or bench type seats. A number of other interior components are usually mounted directly or in close proximity to these seats. The components can include pivotal and stationary armrests, seat belts, headrests, cup holders, and storage console assemblies.

The storage console assemblies are typically positioned in the center of the bench type seats or between a pair of bucket type seats. Accordingly, these console assemblies are typically called center console assemblies. The consoles usually have at lease one storage compartment with a pivotal lid for opening and closing the compartment. The pivotal lid can also act as an armrest. The storage compartment is utilized for storing any number of items such as portable phones, compact discs, pens, note pads, or the like. The center console assemblies known in the art are either pivotally mounted to the bench type seats or fixedly secured to a floor of the vehicle interior between the bucket type seats. Most commonly, the center consoles are part of a modular unit which also includes a transmission shift lever, parking brake, mirror controls, and the like.

SUMMARY OF INVENTION AND ADVANTAGES

The subject invention includes an interior assembly for a vehicle comprising a center console and a guide member for mounting the console to the vehicle. The guide member has a first end and a second end defining a reciprocal path therebetween. The assembly is characterized by a carriage operatively coupled between the console and the guide member for slidably moving the console on the guide member along the reciprocal path between the first and second ends.

Accordingly, the subject invention provides for a moveable center console assembly which can slide from a position adjacent a front seat to a position adjacent a rear seat. The moveable center console can also be moved to any other position between the front and rear seats and even to a position behind the rear seats. In fact, in the broadest sense of the invention, the center console assembly need not be dependent upon any particular seat or seat arrangement and can slide to any position from the front to the rear of the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

For convenience in the following description, various directional or other spatial references are made with regard to the orientation of structure(s) shown in the drawings. It is understood, however, that such references, including without limitation, upper, lower, top, bottom, front, back, left, right, center, vertical, horizontal, lateral or longitudinal, are made for convenience only and should not necessarily be construed to be limiting on the invention described herein.

Figure 1:
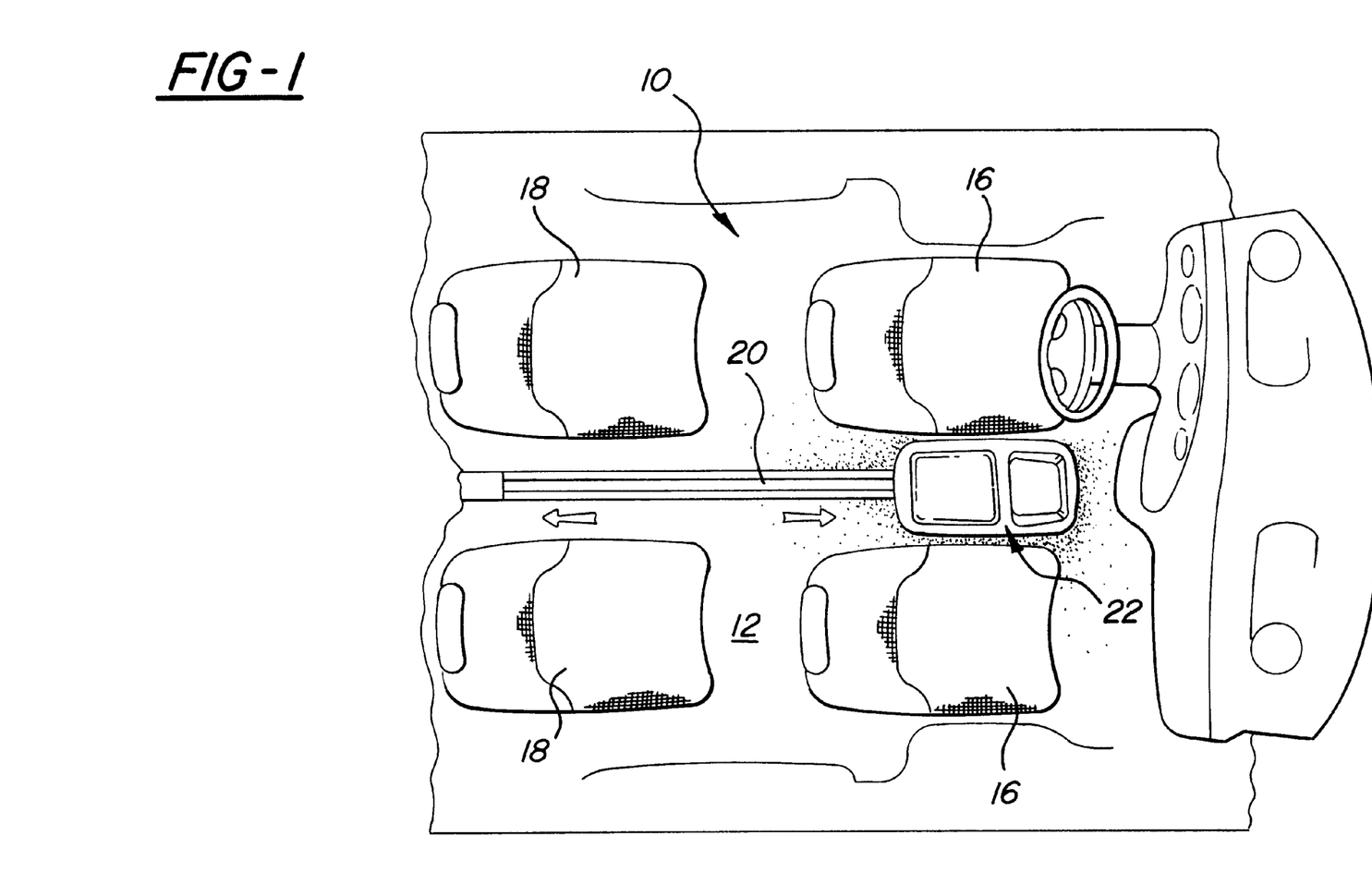
FIG. 1 of the drawings illustrates an embodiment of the present invention showing a sliding center console between the seats of a mini-van type vehicle.

Referring to the Figures, wherein like numerals indicate like or corresponding parts throughout the several views, there is schematically shown in FIG. 1 a interior assembly for a vehicle, generally indicated at 10. The vehicle interior 10 includes a floor surface 12 which may be covered by a carpet 14. Vehicle interior 10 may represent the interior of a mini-van which may include a pair of front passenger seats, generally indicated at 16, and a pair of similar rear passenger seats, generally indicated at 18, placed behind the front seats 16. Additional passenger seats may be placed behind the rear seats 18. As appreciated by those skilled in the art, the subject invention is not dependent upon any particular type of vehicle or seating arrangement.

A guide member, generally shown at 20, serves to mount a multi-position sliding center console, generally indicated at 22, which functions and is constructed in accordance with the principles of the present invention. The term center console is a term of the art typically used for these types of console assemblies. The console assembly of the subject invention may be positioned anywhere within the vehicle interior and not necessarily along a center between a set of passenger seats.

As shown in FIG. 1, the sliding center console 22 is free to travel forwardly and rearwardly along the guide member 20. Specifically, the guide member 20 has first and second ends defining a reciprocal path therebetween. Preferably, the guide member 20 comprises a center mounted track assembly 20 fixed to the floor surface 12 of the vehicle interior 10. The center console 22 may be selectively locked into position at any of a plurality of locations along the track assembly 20. The center mounted track assembly 20 preferably extends from a position between the front passenger seats 16 rearwardly to a position between the rear passenger seats 18. Track assembly 20 may also extend beyond the rear passenger seats 18.

Figure 2:
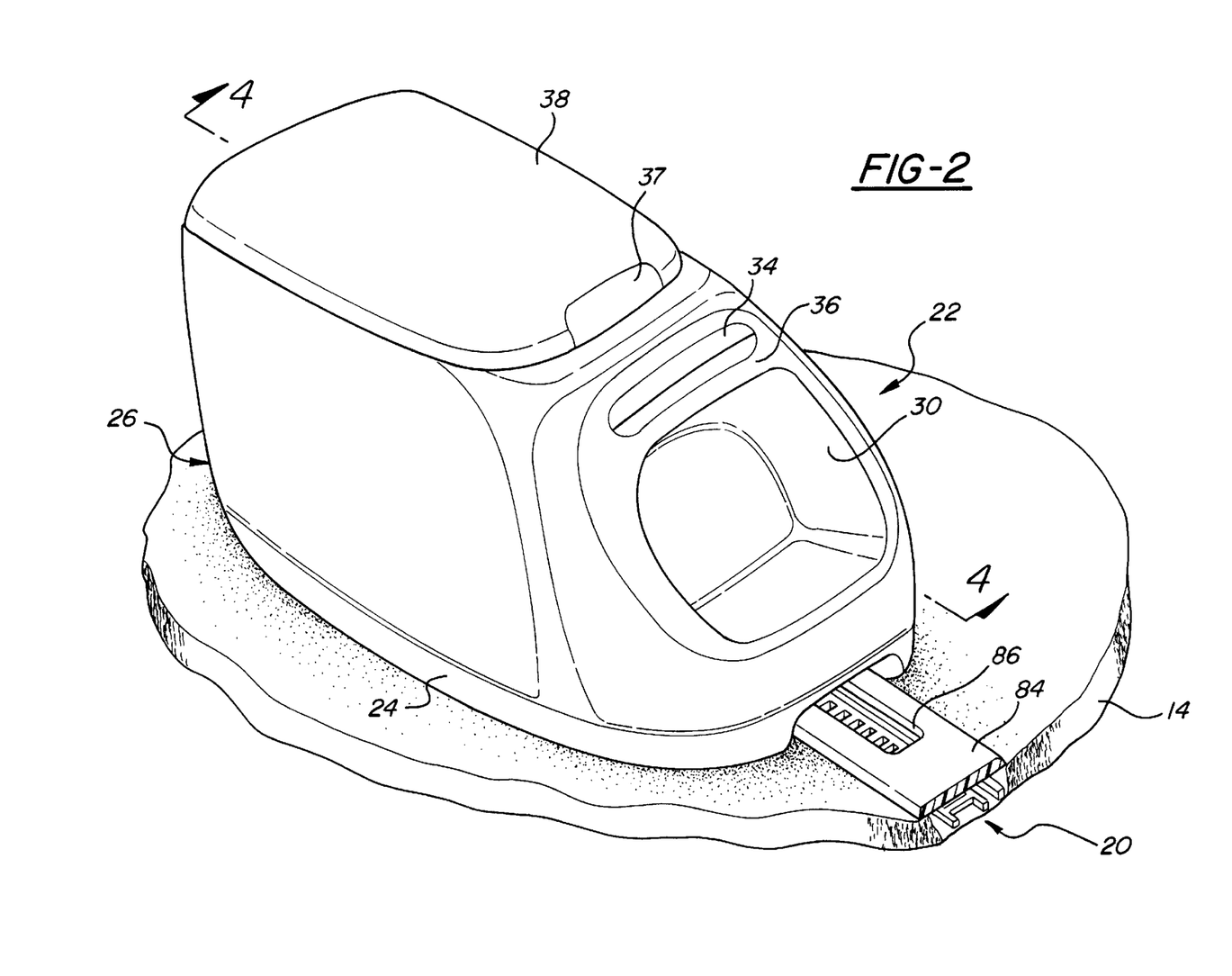
FIG. 2 of the drawings is a perspective view of one embodiment of a sliding center console mounted on a floor mounted track member.
Figure 4:
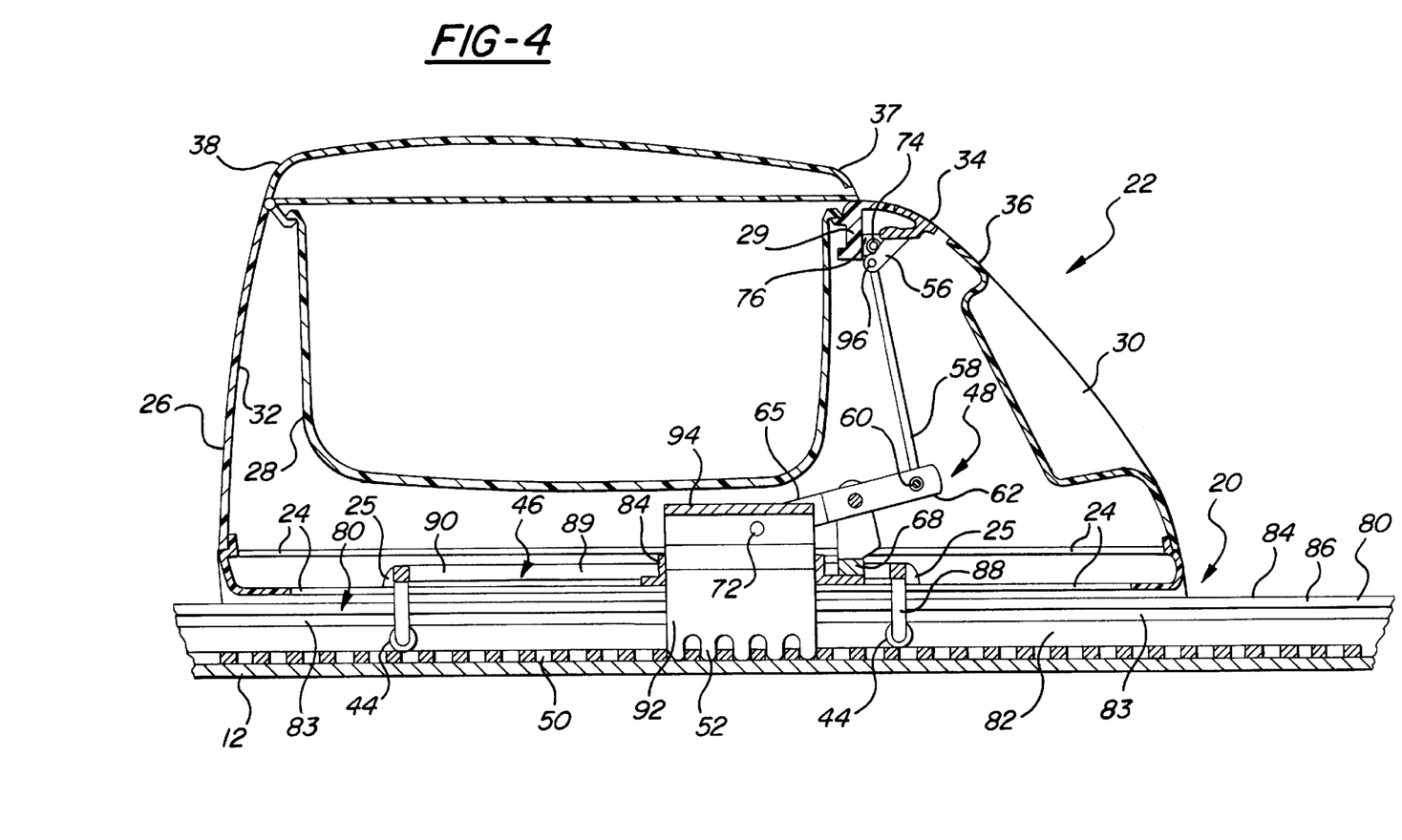
FIG. 4 of the drawings is a cross-section of the sliding center console of FIG. 2 taken along line IV—IV.

As shown in FIGS. 2 and 4, the sliding center console 22 generally comprises a console body 26 having a lower platform structure 24. In other words, the center console 22 is a two piece assembly. The console body 26 being the top portion and the platform structure 24 being the bottom portion. The platform structure 24 is secured to the console body 26 by any suitable means as are well known in the art. Alternatively, there could be a bottom wall portion of the console body 26, as opposed to the platform structure 24, which could operate in a similar manner as the platform structure 24. The platform structure 24 includes an integral slot 23 and a number of support apertures 25. A bracket attachment structure 29 is also mounted to the console body 26 as will be discussed in greater detail below. In the illustrated embodiment, a first storage bin 28 is located inside console body 26 and is covered by a lid 38. The lid 38 may be pivotal between an open position for access to the first storage bin 28 and a closed position covering the first storage bin 28. A second storage bin 30 comprises a molded recessed area formed in the console body 26. Each of these storage bins 28, 30 are designed for storing any number of items such as portable phones, compact discs, tapes, pens, note pads, or other like devices.

The first storage bin 28 may be removable and may also be compartmentalized, fitting into a large cavity 32 accessible at the top portion of the console body 26. The pivotal lid 38 may include a release handle 37 for securing the lid 38 to the console body 26. The handle 37 is operable in a conventional manner to selectively release a locking mechanism (not shown) which locks the lid 38 in a closed position with respect to the first storage bin 28.

Figure 3:
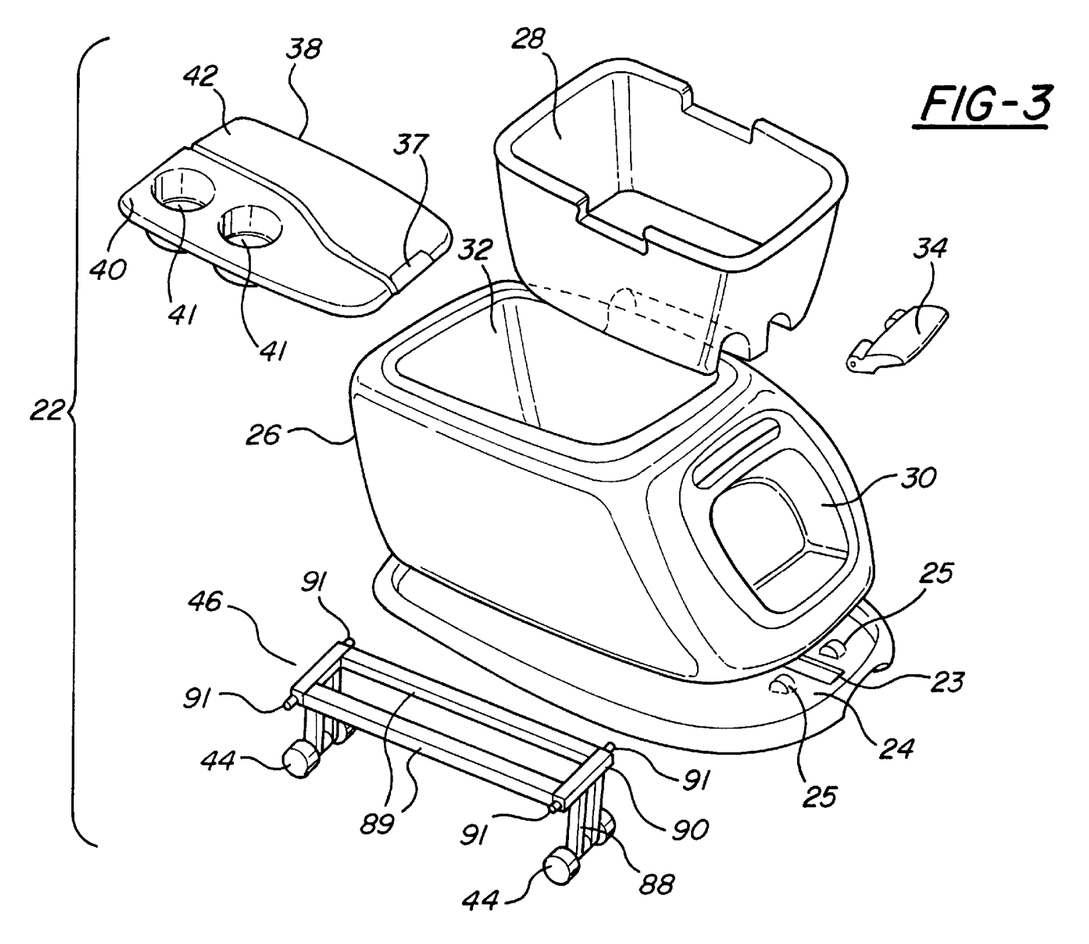
FIG. 3 of the drawings is an exploded perspective view of the sliding center console.

Alternatively, as best shown in FIG. 3, the lid 38 may be removable to support a multitude of functions. It can be appreciated that a number of different cover-type removable lids may be incorporated as the removable lid on the top of the console 22.

The removable lid 38 comprises a first console lid 42 and a second console lid 40 as shown. The first console lid 42 covers a first portion of the first storage bin 28 and is moveable between an open position for access to the first storage bin 28 and a closed position covering the first storage bin 28. The second console lid 40 is mounted adjacent to the first console lid 42 and covers a second portion of the first storage bin 28 and is moveable independent of the first console lid 42 between an open position for access to the first storage bin 28 and a closed position covering the first storage bin 28.

In the illustrated embodiment, the first console lid 42 includes a release handle 37 for locking and unlocking the first console lid 42 from the console body 26. The second console lid 40 contains recessed circular cavities 41 molded into lid 40 for securing and supporting cup-like containers. By providing a two-part lid 38, one part of the lid 38 can be lifted to permit access to the bin 28 while leaving the other part of the lid 38, which may be supporting drinking containers or other objects, undisturbed. Preferably, the first portion covered by the first console lid 42 is larger than the second portion covered by the second console lid 40. In other words the first console lid 42 is larger than the second console lid 40. This is designed such that the first console lid 42 can adequately house the release handle 37.

The console 22 can have an adjustable table top-like surface that, when raised, can provide a surface for writing, for supporting a lap top computer, or providing for food and beverage areas as desired by the user. The large variety of removable lids 38, with and without releasing handles, and differently shaped and sculptured top surfaces that can be positioned over the front storage bin allows for a multitude of possible embodiments to be considered for the present invention.

A lock release handle 34 on an upper end portion 36 of the console body 26 allows the sliding center console 22 to be unlocked for movement along the center-mounted track assembly 20 as will be described in more detail below.

Figure 7:
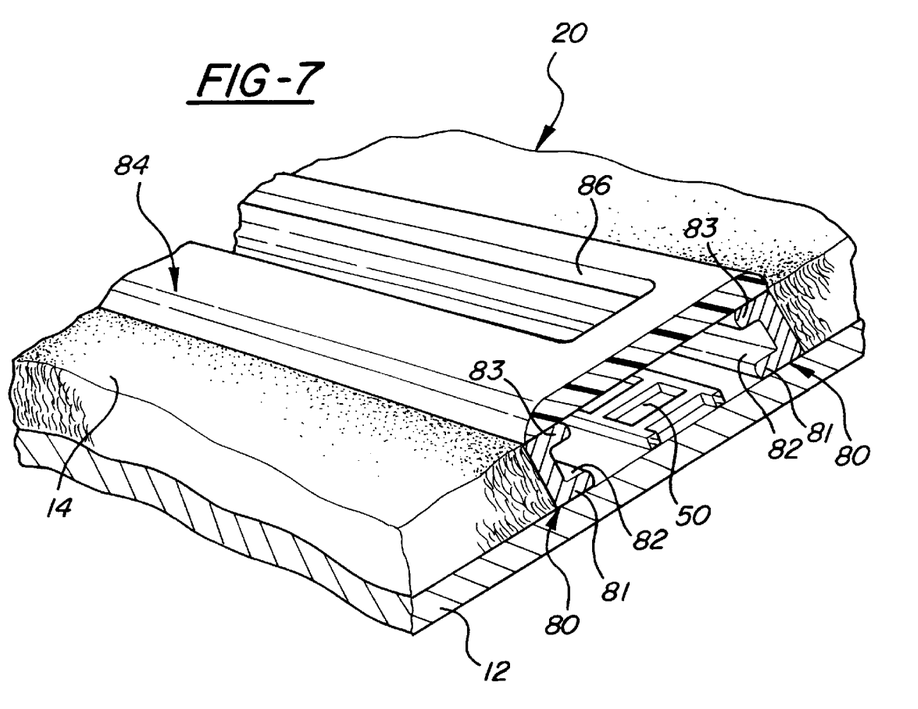
FIG. 7 of the drawings is a perspective view of the track installed in the vehicle floor on which the sliding center console travels forwardly and rearwardly.

As shown in FIGS. 4 and 7, track assembly 20 is preferably comprised of two spaced, parallel rail elements 80 for guiding the console within the vehicle. Rail elements 80 are preferably of a channel structure having substantially C-shaped cross-sections with top and bottom flanges 83, 81, which define opposed, facing longitudinal grooves 82.

Rail elements 80 are attached to the floor 12 by suitable means such as by welding or mechanical fasteners, and carpet 14 is preferably provided over the floor 12 on opposite sides of the track assembly 20 with the top of the carpet 14 preferably being substantially flush with the top of the rails 80. An ornamental cover 84 defining a longitudinal center slot 86 is preferably provided to cover and protect the rails 80. The center slot 86 is disposed along the reciprocal path of the guide member 20.

As shown in FIGS. 3 and 4, console body 26 is supported and movable on the track assembly 20 by means of a carriage, generally indicated at 46, having rotatably mounted thereon a plurality of rollers 44. Specifically, the carriage 46 is operatively coupled between the console 22 and the guide member 20 for slidably moving the console 22 on the guide member 20 along the reciprocal path between the first and second ends.

Four rollers, two on each side, are preferred. The carriage 46 includes a lower portion 88 engaged with the guide member 20 and an upper portion 90 mounted to the console body 26 for moving the center console 22 along the guide member 20. The upper portion 90 of the carriage 46 includes a pair of spaced apart beams 89 and a number of outwardly extending retaining pins 91. The pins 91 lock into a corresponding support aperture 25 on the platform structure 24 to secure the carriage 46 to the center console 22.

The lower portion 88 extends downwardly from the upper portion 90. The lower portion 88 may comprise a pair of support legs (as shown) or a single support leg. The lower portion 88 of the carriage 46 travels within the rail elements 80 of the track assembly 20. Rollers 44 are rotatably mounted at a lower end of lower portion 88 opposite upper portion 90. The legs of the lower portion 88 extend from the rail elements 80 through the center slot 86 above the ornamental cover 84. The legs of the lower portion 88 also extend through the integral slot 23 of the platform structure 24. Accordingly, the upper portion 90 is also extended above the cover 84 and above the integral slot 23 of the platform structure 24. Hence, the upper portion 90 is actually disposed within the cavity 32 of the center console 22.

As shown in FIG. 4, when console 22 is operatively engaged with track assembly 20, rollers 44 ride along the bottom flange 81 within the longitudinal grooves 82 of the rails 80. The upper 90 and lower 88 portions of the carriage 46 along with the rollers 44 support console body 26 above the track assembly 20 when rollers 44 are disposed in grooves 82. As appreciated by those skilled in the art, the rollers 44 may be positioned anywhere within the track assembly 20 so long as the console body 26 is adequately supported.

The center console 22 includes a locking mechanism, generally indicated at 48, supported on the lower platform structure 24. The locking mechanism 48 selectively locks console 22 in one of a plurality of incremental positions along the reciprocal path of the track assembly 20. Specifically, track assembly 20 includes a series of slot-like locking apertures 50 defining the incremental positions and disposed between the pair of spaced rails 80, which are engaged by locking mechanism 48, as will be described below, to selectively lock the sliding center console 22 in place.

Figures 5A, 5B:
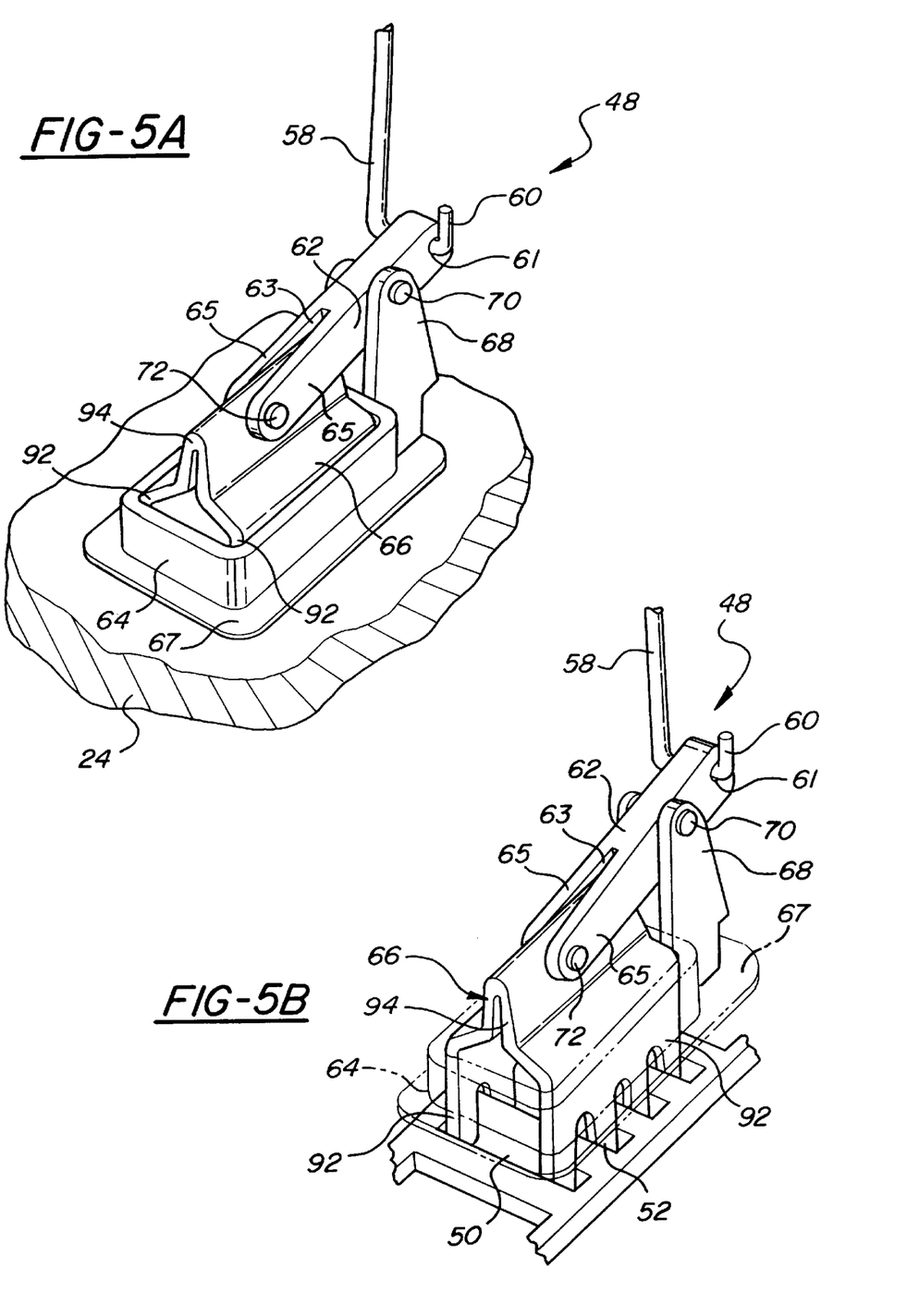
FIG. 5A of the drawings shows a partial perspective view of a locking mechanism of the sliding center console.
FIG. 5B of the drawings is a partially cut out perspective view illustrating locking slot-like apertures and mating locking teeth of the locking mechanism.

Details of the locking mechanism will be described with reference to FIGS. 4, 5A, and 5B. The locking mechanism 48 includes a locking member 66 preferably comprising an upwardly extending center crown portion 94 and two spaced apart, substantially parallel locking plates 92 depending downwardly from crown portion 94 and each having a plurality of locking teeth 52 formed along a lower edge thereof. Locking member 66 operates between the beams 89 of the carriage 46 and extends through a like-shaped opening formed within the lower platform structure 24 to engage locking apertures 50 disposed between rails 80. A protective engagement enclosure 64, comprising a continuous upwardly extending wall which defines a generally rectangular opening similar in size and shape to the rectangular signature of locking member 66, preferably surrounds locking member 66 to keep locking member 66 aligned with the opening formed in the platform structure 24. Enclosure 64 may include a peripheral lateral flange 67 for fixing enclosure 64 to the platform structure 24.

An upwardly extending support block 68 comprising parallel upwardly extending prongs and a transverse connection portion is mounted at a position outside the protective engagement enclosure 64 and may be mounted to the peripheral flange 67 of enclosure 64. Alternatively, the block 68 may be attached to a console supporting structure, such as the platform structure 24.

A lever rod 62 is pivotally mounted to support block 68 by means of a pivot pin 70. One end of lever rod 62 is connected to a control rod 58 by means of a hook 60 formed in a lower end of rod 58 extending through opening 61 formed in the end of lever rod 62. Control rod 58 provides further control of locking mechanism 48 by the release handle 34 (see, e.g., FIG. 6) as will be described in more detail below.

An opposite end of lever rod 62 preferably includes a longitudinally extending center slot 63 defining opposed parallel prongs 65 having a spacing therebetween wide enough to accommodate center crown portion 94 of locking member 66. Lever rod 62 is pivotally connected to locking member 66 by means of a pin 72 extending through the ends of prongs 65 and through center crown portion 94 of locking member 66 disposed between prongs 65.

Locking member 66 is moved up and down to disengage and engage the locking teeth 52 with the locking apertures 50 by pivoting lever rod 62 about pin 70 on mounting block 68.

The locking mechanism 48 is unlocked and disengaged in the preferred embodiment by the lock release handle 34. Specifically, the lock release handle 34 actuates the locking member 66 between a locked position engaging the track assembly 20 and securing the console 22 in one of the incremental positions and an unlocked position released from the track 20 and allowing movement of the console 22 along the reciprocal path.

Figure 6:
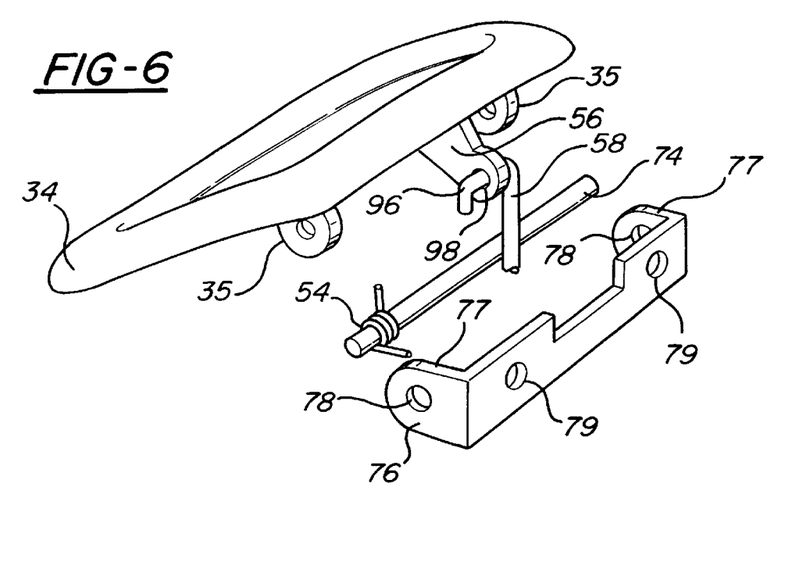
FIG. 6 of the drawings is a perspective view of a disassembled lock release handle and control rod mechanism.

As shown in FIGS. 4 and 6, the lock release handle 34 has a protruding actuating attachment 56 to which the control rod 58 translates actuation of the handle 34 to the locking member 66. A hooked upper end 96 of the control rod 58 attaches to the lock release handle 34 through a control rod attachment opening 98 formed in the protruding actuating attachment 56.

The lock release portion of the console 22 comprises the lock release handle 34, the control rod 58, a release handle pivot rod 74, and a torsion spring element 54. The control rod 58 extends down through the sliding center console 22 to the locking mechanism 48. The lock release handle 34 is pivotally mounted to a handle mounting bracket 76 by the release handle pivot rod 74. The release handle pivot rod 74 passes through a pair of circular openings defined in respective mounting flanges 35 extending at a right angle from the lock release handle 34 to engage a pair of circular openings 78 formed in each of a pair of right angled extremities 77 on the handle mounting bracket 76. The lock release handle 34 is biased into a locked position by the torsion spring elements 54. Mounting bracket 76 may be fixed to console body 26 by means of suitable fasteners or integrally molded plastic bullets extending through attachment holes 79 formed in bracket 76 and into the bracket attachment structure 29 formed within console body 26.

When the lock release handle 34 is raised upwardly by the user, the control rod 58 is pushed down, thus causing the lever rod 62 to pivot in an unlocking sense and lift the locking member 66, thus disengaging the series of locking teeth 52 from the series of locking apertures 50. With the locking teeth 52 disengaged from the locking apertures 50, the center console 22 is free to translate along track assembly 20 as the rollers 44 of the carriage 46 may roll within grooves 82 of rails 80. When the lock release handle 34 is released, the elastic torsion spring element 54 urges the lock release handle 34 downwardly which pulls the control rod 58 up, causing the lever rod 62 to pivot in a locking sense and thus causing the locking teeth 52 to engage the slot-like locking apertures 50, locking the sliding center console 22 in place on the center-mounted track assembly 20.

The torsion spring element 54, in addition to providing bias for the lock release handle 34 to remain in the locked position, keeps the release handle 34 properly positioned within the handle mounting bracket 76.

In an alternate embodiment, the lock release handle 34 can be a linearly actuated spring loaded push button plunger as opposed to a pivoting handle structure. The push-button plunger may be directly coupled to the control rod 58 so that the user pushes down upon the lock release button, as opposed to lifting up a pivoting handle, to unlock the sliding center console 22 from the center-mounted track assembly 20. The release button plunger is spring biased into an upward position so that when the button is released the plunger and control rod 58 are urged upwardly to cause the locking mechanism 48 to again lock the center console 22 in place.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. An interior assembly for a vehicle comprising:
    a center console;

a guide member for mounting said console to the vehicle;

said guide member having first and second ends defining a reciprocal path therebetween, said guide member being further defined as a track assembly including a set of rail elements having a top flange and a bottom flange defining a set of longitudinal grooves;

a carriage operatively coupled between said console and said guide member, said carriage including a lower portion engaging said guide member and an upper portion mounted to said console;

said interior assembly characterized by said lower portion of said carriage including a set of rollers rotationally engaging said bottom flange within said longitudinal grooves for moving said console on said guide member along said reciprocal path between said first and second ends.

2. An assembly as set forth in claim 1 wherein said lower portion of said carriage travels within said rail elements of said track assembly.

3. An assembly as set forth in claim 2 further including an ornamental cover enclosing said rail elements of said track assembly.

4. An assembly as set forth in claim 3 wherein said ornamental cover includes a center slot disposed along said reciprocal path of said guide member.

5. An assembly as set forth in claim 4 wherein said upper portion of said carriage extends from said rail elements through said center slot above said cover.

6. An assembly as set forth in claim 1 further including a locking mechanism for securing said console in one of a plurality of incremental positions along said reciprocal path.

7. An assembly as set forth in claim 6 wherein said locking mechanism includes a locking member for selectively engaging said track assembly to secure said console within the vehicle.

8. An assembly as set forth in claim 7 wherein said locking member includes a number of locking teeth which engage a plurality of slot-like apertures defining said incremental positions and disposed within said track assembly.

9. An assembly as set forth in claim 8 wherein said locking teeth are mounted to a pair of locking plates extending from said locking member.

10. An assembly as set forth in claim 9 further including a protective engagement enclosure mounted to said console and surrounding said locking member.

11. An assembly as set forth in claim 7 further including a lock release handle for actuating said locking member between a locked position engaging said track assembly and securing said console in one of said incremental positions and an unlocked position released from said track assembly and allowing movement of said console along said reciprocal path.

12. An assembly as set forth in claim 11 further including a control rod mounted to said lock release handle for translating actuation of said handle to said locking member.

13. An assembly as set forth in claim 12 wherein said lock release handle includes a torsion spring element for biasing said handle and said locking member toward said locked position.

14. An assembly as set forth in claim 12 further including a lever rod pivotally mounted to said locking member and interconnecting said control rod with said locking member.

15. An assembly as set forth in claim 11 wherein said console includes a console body having a bottom wall portion for supporting said locking member.

16. An assembly as set forth in claim 11 wherein said console includes a console body having a lower platform structure for supporting said locking member.

17. An assembly as set forth in claim 15 wherein said console body includes a first storage bin mounted within a large cavity for storing a number of items within the vehicle.

18. An assembly as set forth in claim 17 wherein said console body includes a lid pivotal between an open position for access to said first storage bin and a closed position covering said first storage bin.

19. An assembly as set forth in claim 17 wherein said console body includes a second storage bin for storing items within the vehicle.

20. An interior assembly for a vehicle comprising:

a center console;

a guide member for mounting said console to the vehicle, said guide member having first and second ends defining a reciprocal path therebetween;

a carriage operatively coupled between said console and said guide member for moving said console on said guide member along said reciprocal path;

a locking mechanism for securing said console in one of a plurality of incremental positions along said reciprocal path, said locking mechanism including a locking member for selectively engaging said guide member to secure said console within the vehicle;

said assembly characterized by said locking member including a number of locking teeth which engage a plurality of slot-like apertures defining said incremental positions and disposed within said guide member.

21. An assembly as set forth in claim 20 further including a lock release handle for actuating said locking member between a locked position engaging said guide member and securing said console in one of said incremental positions and an unlocked position released from said guide member and allowing movement of said console along said reciprocal path.

22. An assembly as set forth in claim 21 further including a control rod mounted to said lock release handle for translating actuation of said handle to said locking member.

23. An assembly as set forth in claim 22 further including a lever rod pivotally mounted to said locking member and interconnecting said control rod with said locking member.

24. An assembly as set forth in claim 21 wherein said console includes a console body having a bottom wall portion for supporting said locking member.

25. An assembly as set forth in claim 20 wherein said console includes a console body having a lower platform structure for supporting said locking member.

\* \* \* \* \*